US009131408B1

(12) United States Patent
Falsafi

(10) Patent No.: US 9,131,408 B1
(45) Date of Patent: Sep. 8, 2015

(54) APPARATUS AND METHOD THROTTLING NETWORK BANDWIDTH BASED ON DATA USAGE

(75) Inventor: Aram Falsafi, Miami, FL (US)

(73) Assignee: Tellabs Operations, Inc., Naperville, IL (US)

( * ) Notice: Subject to any disclaimer, the term of this patent is extended or adjusted under 35 U.S.C. 154(b) by 680 days.

(21) Appl. No.: 13/005,049

(22) Filed: Jan. 12, 2011

(51) Int. Cl.
*H04W 28/02* (2009.01)
*H04W 28/20* (2009.01)
*H04W 48/18* (2009.01)

(52) U.S. Cl.
CPC .............. *H04W 28/20* (2013.01); *H04W 48/18* (2013.01)

(58) Field of Classification Search
USPC .................................. 370/252, 232; 709/225
See application file for complete search history.

(56) References Cited

U.S. PATENT DOCUMENTS

| | | | | |
|---|---|---|---|---|
| 8,055,237 B2* | 11/2011 | Jones et al. | ................... | 455/405 |
| 8,280,346 B2* | 10/2012 | Jones et al. | ................... | 455/405 |
| 8,321,565 B2* | 11/2012 | Bao et al. | ...................... | 709/225 |
| 2006/0229896 A1* | 10/2006 | Rosen et al. | ...................... | 705/1 |
| 2008/0276000 A1* | 11/2008 | Motte et al. | .................. | 709/233 |
| 2010/0023699 A1* | 1/2010 | Reidel et al. | .................. | 711/134 |
| 2010/0035576 A1* | 2/2010 | Jones et al. | ................... | 455/406 |
| 2010/0138563 A1* | 6/2010 | Chambers | ........................ | 710/3 |
| 2010/0250746 A1* | 9/2010 | Murase | ......................... | 709/226 |
| 2010/0332615 A1* | 12/2010 | Short et al. | .................... | 709/217 |
| 2011/0106946 A1* | 5/2011 | Bao et al. | ...................... | 709/225 |
| 2011/0110243 A1* | 5/2011 | Call | ............................. | 370/252 |
| 2012/0131137 A1* | 5/2012 | Singh et al. | ................... | 709/217 |
| 2012/0136989 A1* | 5/2012 | Ferris et al. | ................... | 709/224 |
| 2012/0155296 A1* | 6/2012 | Kashanian | .................... | 370/252 |

* cited by examiner

*Primary Examiner* — Orgad Edan
*Assistant Examiner* — Emmanuel Maglo
(74) *Attorney, Agent, or Firm* — James M. Wu; JW Law Group

(57) ABSTRACT

A system and method capable of scaling or gradually scaling bandwidth of a network flow over a period of time based on network usage are disclosed. In one embodiment, a process or network system obtains a network usage subscription after detecting a network flow. After retrieving a usage subscription and record in accordance with the network flow, the amount of data transferred since the beginning of a predefined time period is identified. Upon identifying the available data transfer quota, the process is able to gradually scale the bandwidth of the flow based on the available data transfer quota.

19 Claims, 8 Drawing Sheets

APPARATUS AND METHOD THROTTLING NETWORK BANDWIDTH BASED ON DATA USAGE

FIELD

The exemplary embodiment(s) of the present invention relates to communications network. More specifically, the exemplary embodiment(s) of the present invention relates to network bandwidth allocation based upon previous usage.

BACKGROUND

A network environment typically includes hundreds and thousands of network nodes and/or devices, such as routers, hosts, hubs, and switches, capable of delivering information using packets or packet flows from source devices to destination devices. With increasing demand for more information to be transmitted between users/subscribers and content providers, network providers constantly upgrade the network(s) to up-to-date technology with faster high-speed communication links to handle voluminous data files. High-speed communication typically enhances bandwidth and speed for voice, video, and data transmission to/from homes and/or businesses.

With exploding growth of mobile data transfer over a wired and wireless network, wireless providers are transitioning from 2G wireless service to more data intensive 3G or 4G services. Moving or transporting massive amounts of information over a communications network can cause traffic congestions partially due to the fact that the pace of growth in demand for network bandwidth is faster than the improvement of technology that is able to handle the traffic.

To alleviate traffic congestion, network providers implement data transfer metering systems. For example, a metering system offers an option to subscribers who can pick and choose their monthly data upload and download quotas to fit their needs. A problem associated with subscribed data plan, however, is that unlike voice usage, typical subscribers do not know how much bandwidth they have consumed in a given period of time. Since an unlimited data plan is less economically viable, an approach is to have a data plan that offers a certain amount of usage per month and charges additional fees if the usage exceeds the subscribed quota. A drawback associated with this plan is that the subscribers may have a tendency to cut down their usage prematurely due to the fear of overuse that may result in unexpected extra charges, a phenomenon known as sticker shock. In this application, the term "transfer" could refer to data download from a network location to a user, or data upload, from a user to a network location.

Another approach is to have a data plan that offers a certain amount of data transfer per month, and cuts off data service if the data transfer reaches or exceeds the subscribed quota. A problem associated with this approach is that subscribers cut down their usage for the fear of depleting the purchased quota before the end of subscribed time period. As such, simply introducing a cap will discourage user(s) from taking full advantage of their data plans. Furthermore, if may subscribers have the same billing period (for example from the first day to the last day of the month), a policy of cutting off service when users reach their quota could lead to wasted (idle) network bandwidth at the end of the month when many users have used up their monthly quota, and network congestion at the beginning of every month when all users are at maximum bandwidth.

SUMMARY

A network system is capable of scaling or gradually throttling bandwidth of a network flow over a period of time based on past usage of bandwidth relative to a usage quota. In one embodiment, a process or network system obtains a network usage history and usage quota after detecting a network flow. After retrieving a usage subscription and record from storage in accordance with the network flow, the amount of data consumed since the beginning of a predefined time period is identified. Upon identifying the available transfer quota, the process is able to scale or gradually scale the bandwidth of the flow based on the available transfer quota.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
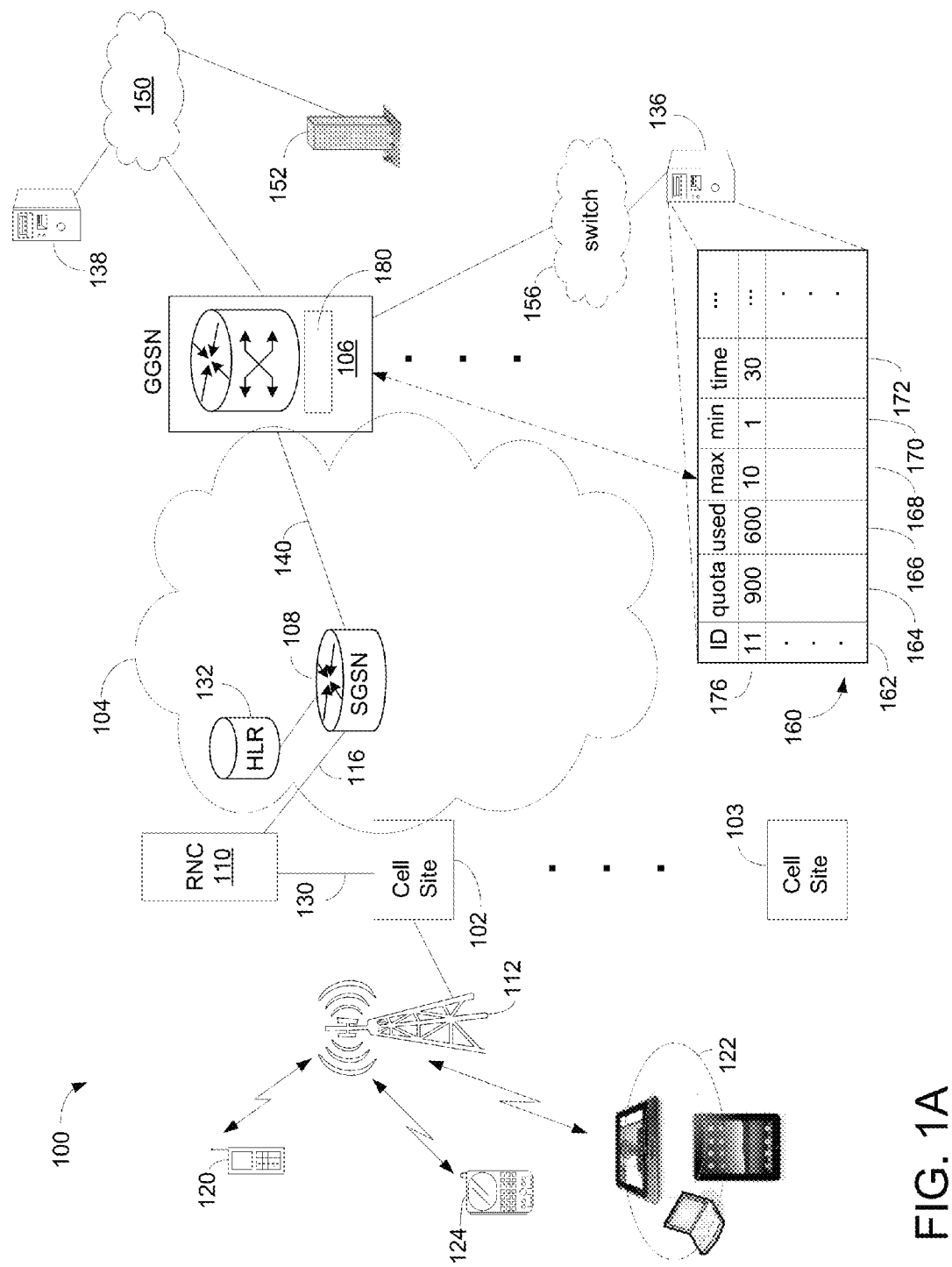
FIG. 1A is a block diagram illustrating a network configuration having one or more network nodes capable of throttling bandwidth of a network flow based on transfer quota in accordance with one embodiment of the present invention.

Exemplary embodiment(s) of the present invention is described herein in the context of a method, device, and apparatus of scaling or gradually scaling network bandwidth of a packet flow over a time period in response to usage of subscribed transfer quota.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

References to "one embodiment," "an embodiment," "example embodiment," "various embodiments," "exemplary embodiment," "one aspect," "an aspect," "exemplary aspect," "various aspects," et cetera, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

It should be noted that the term "data packets" can also be referenced as "data stream," "data flow," "flow," "packet flow," "packet stream," "data frames," "information," "frames," et cetera. Moreover, connections may also include wires, wireless connections, cables, coax lines, telephone lines, Internet backbones, Ethernet connections, and so forth.

Exemplary embodiment(s) of the present invention discloses a throttling bandwidth system ("TBS") capable of throttling or gradually throttling network bandwidth of a packet flow over a period of time. In one embodiment, a process capable of implementing TBS is able to fetch a network usage subscription as soon as it detects a network flow traveling through the network. After retrieving the usage subscription and record associated with the network flow from a storage location, the amount of data consumed since the beginning of a predefined time period is calculated. After identifying the available transfer quota, the TBS process is able to update new bandwidth or speed for data transmission for the flow in response to the available transfer quota.

FIG. 1A is a block diagram 100 illustrating a network having one or more network nodes capable of throttling bandwidth of a network flow based on transfer quota in accordance with one embodiment of the present invention. Diagram 100 illustrates cell sites 102-103, switching network 104, network nodes 106-108, and radio network controller ("RNC") 110. Node 106 is further coupled to Internet, a wide area network ("WAN"), or virtual private network ("VPN") 150. Internet, WAN, or VPN 150, hereinafter referred to as Internet, provides network communication between node 106 and network devices such as server 138 and content provider 152. FIG. 1A essentially describes a third generation ("3G") cellular implementation. Note that a different generation or architecture such as 4G or 5G may contain a different layout of network elements, and/or differently-named network elements. It should be noted that the underlying concept of the exemplary embodiment(s) of the present invention would not change if one or more blocks (or devices) were added to or removed from diagram 100.

RNC 110, for example, may be coupled to other network elements such as a second RNC or PCU (packet control unit), not shown in FIG. 1, to enhance network management and communication. Connections 116 and 140 are used to facilitate communication between RNC 110 and node 106 wherein connections 116 and 140 may be wired or wireless connections. RNC 110 provides network management for controlling network elements ("NEs") in UMTS (universal mobile telecommunications system) radio access network ("UTRAN") and base stations that are connected to it. RNC 110 may also connect to a serving general packet radio service support node ("SGSN") in a packet switch core network ("PSCN").

Network node 106, which in one embodiment can be a GGSN, includes one or more routers or switchers capable of managing, monitoring, and routing network traffic or network flows between sources and destinations. A network flow or packet flow, in one example, is a network access initiated by a subscriber. Network node or GGSN 106, hereinafter referred to as GGSN, can also be a router, Access Service Network Gateway, Packet Data Network Gateway, Serving Gateway, switch, hub, or a combination of router, Access Service Network Gateway, Packet Data Network Gateway, Serving Gateway switch, and/or hub. GGSN 106, in one embodiment, is able to access a subscription database 160 via a bandwidth control server 136. Depending on the applications, server 136, for example, can be directly connected to GGSN 106 or connected through switching network 156. Alternatively, server 136 may be built into GGSN 106. A function of GGSN 106 is to monitor and/or inspect every packet flow in the network traffic based on subscriptions as well as policies, and is capable of adjusting the bandwidth or speed of transmission of packet flow based on subscribed quota. Note that GGSN 106 is also able to record network usage whereby users will be billed at a later time based on their usage of network resources.

Switching network 104 transfers or routes information or network traffic between multiple clients or between clients and network servers. Switching network 104 can be an IP and/or Multi Protocol Label Switching ("MPLS") based switching network which may operate at a layer of Open Systems Interconnection Basic Reference Model ("OSI model"). Network 104 may further include network node 108, a home location register ("HLR") 132, and RNC 110. Network 104 is capable of routing information between cell sites 102-103 and Internet 150 via nodes 106-108. Node 108 transmits information between cell site 102 and HLR 132 via connections 116 and 130. GGSN 106 transmits information to (and receives information from) cell site 102 via connections 140, 116, and 130.

Node 108, in one embodiment, is an SGSN configured to authenticate portable wireless UEs, registering mobile devices, collecting network usage information for billing, et cetera. While SGSN 108 tracks and/or controls mobile communication, GGSN 106 inspects and routes information and/or packet traffic between mobile terminal(s) and intended destination(s). Alternatively, node 108 may be a mobility management entity ("MME") which is also able to route packet streams in a long term evolution ("LTE") network. MME, for example, can track and/or page active and/or idle UEs or subscribers' mobile terminals in an LTE network. It should be noted that node 108 can be SGSN, MME, and/or a combination of SGSN and MME.

Cell site 102, also known as base station or node B, includes a radio tower 112, wherein radio tower 112 is further coupled to various UEs, such as a cellular phone 120, a handheld device 124, Ipad® 122, via wired or wireless communications. Handheld device 124 can be a smart phone, such as iPhone®, BlackBerry®, Android®, and so on. Cell site 102 is also capable of facilitating network communication between mobile devices such as handheld device 124 and Ipad® 122 via radio tower 112. It should be noted that cell site 102 may include additional radio towers as well as other land switching circuitry.

In FIG. 1A, network 100 further includes a subscription database 160 which stores and organizes information relating to user subscriptions. When a network client or user subscribes or purchases a network service plan or data plan, an entry of database 160 is created to store necessary subscription related information or data such as identity of a user and subscribed quota. The information stored in database 160 is used to control and/or throttle bandwidth of a particular network flow based on the subscribed data. The term "bandwidth" can also be referred to as network bandwidth, flow bandwidth, data bandwidth, digital bandwidth, speed of transmission, transmission speed, et cetera. For example, when an end user purchases a data plan, an entry 176 is created in database 160.

In one embodiment, entry 176 includes information relating to user identification ("id") 162, subscribed quota 164, maximum bandwidth 168, minimum bandwidth 170, quota used 166, time period 172, and so forth. For example, for the user whose ID 162 equals to "11", quota 164 is set to 900 gigabytes. Quota used 166 indicates that 600 gigabytes have been consumed. The maximum bandwidth 168 is set to 10 megabytes per second while the minimum bandwidth 170 is 1 megabyte per second. Time duration 172 is set to a month (or 30 days). Note that other information relating to the end user or client may also be included in entry 176. For example, other information may include, but not limited to, current bandwidth value, nature of the data, QoS, notification, bandwidth lookup table, and the like. Note that database 160 can reside in GGSN 106, server 136, HLR 132, or remote server 138.

Network client, in one embodiment, can be an end user (mobile or fixed), a content provider, a user equipment ("UE"), a company, and a combination of companies and providers. Service plan or data plan, in one embodiment, includes a set of network service plans with different capacities and quality of services ("QoS"). Depending on the applications, the client or user can purchase or subscribe to a data plan to fit his or her needs. For example, a user who watches video over his or her mobile device may have a different data plan from that of another user who uses his or her mobile device for receiving emails.

GGSN 106, in one embodiment, includes a throttling bandwidth system ("TBS") 180 capable of gradually throttling network speed of a packet flow over a period of time based on subscription data stored in database 160. If the period of time or subscription period is, for example, on a monthly basis time duration, TBS 180, which will be discussed more in detail later, gradually slows down the usage of subscribed quota according to the monthly plan as well as usage pattern. For instance, TBS 180 will reduce and/or gradually reduce transfer speed over the remaining days of the month such that the remaining quota will be more likely to last to the end of the month. Upon identifying the subscribed quota for the current month, TBS 180 is able to determine how many days are left before the end of the month. After calculating how much of the subscribed quota has been consumed, TBS 180 calculates the data rate which will allow subscribers to take full advantage of their data plans without the risk of additional usage charges at the end of the month, or the risk of exhausting the monthly quota before the end of the month.

An advantage of using TBS 180 is to allow 3G or 4G operators to limit data usage to various subscribers without completely cutting their services off (or billing the subscribers for additional charges) starting in the middle of a billing cycle.

Figure 1B:
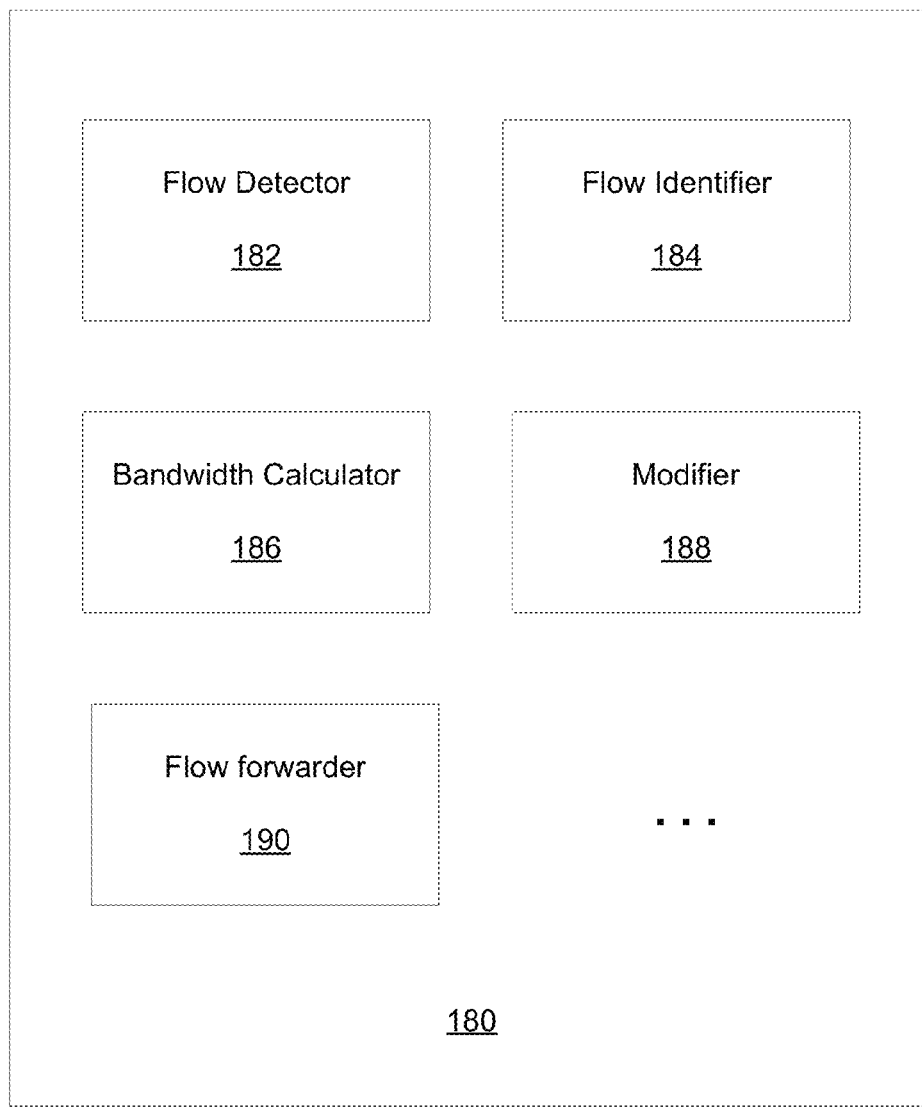
FIG. 1B is a block diagram illustrating a throttling bandwidth system ("TBS") capable of scaling or gradually scaling bandwidth of a packet flow based on a transfer quota in accordance with one embodiment of the present invention.

FIG. 1B is a block diagram illustrating a TBS 180 capable of scaling or gradually scaling bandwidth of a packet flow based on a transfer quota in accordance with one embodiment of the present invention. TBS 180 includes a flow detector 182, flow identifier 184, bandwidth calculator 186, plan modifier 188, and flow forwarder 190. TBS 180 can be hardware, software, or a combination of hardware and software module(s). The components of TBS 180 can be implemented in one device, or distributed across multiple devices. It should be noted that the underlying concept of the exemplary embodiment(s) of the present invention would not change if one or more modules (or circuitries) were added to or removed from TBS 180.

Flow detector 182 monitors packet traffic traveling through GGSN 106 wherein the packet traffic has the similar definition of packet flows, network flows, packet streams, packets, et cetera. Upon detecting a packet flow, flow detector 182 is able to determine whether the flow is a subscribed flow by inspecting the contents of the flow or by querying one or more processes that created the flow. During a detecting phase, flow detector 182, for instance, is able to perform a real-time deep packet inspection ("DPI") to determine the identity of the flow.

Flow identifier 184 is capable of obtaining a network subscription from database 160 (shown in FIG. 1A) using, for example, mobile device ID, as an index (or address) for database 160. As described earlier, a subscription includes information relating to the data plan purchased by a user and usage record(s) associated with the user. Upon identifying an entry associated with the packet flow, flow identifier 184 fetches throttling parameters or values such as transfer quota, id, maximum speed (or bandwidth), minimum speed, time duration, nature of data, and the like.

Bandwidth calculator 186, in one embodiment, uses one or more mathematical algorithms to determine optimal use of a finite resource in a given period, i.e. making X last for a period of Y, without having any or substantial leftover of X when the period of Y lapses, wherein X can be the remaining portion of the quota and Y refers a unit of time duration such as days left in the current subscription month. It should be noted that unlike voice usage, data usage is generally not constant over a period of time. Furthermore, a user is usually not aware of how much data is being transferred. Depending on the applications, the rate of data transfer or bandwidth usage varies over time with occasionally large spikes. As such, the mechanism of throttling flow bandwidth should be performed with sliding window(s) for averaging data usage.

For example, a wireless operator or provider may offer a data plan to a user with a subscribed quota with Q bytes of transfer per month at a speed (S) of bytes per second. Other exemplary throttling parameters relating to the data plan are listed in the following table.

TABLE

Name Explanation

S   Maximum transfer speed that a subscriber has purchased (bytes/sec)
Q   Transfer quota per month (bytes)
M   Days in a month (i.e., 31 for January, 28 or 29 for February, 31 for March, etc.)
q   Q/M = average transfer quota per day (bytes/day)
d   Days gone by this month (for example, d = 5 on January 6)
U   Amount of transfer (bytes) used up (consumed) at this time: U < Q In accordance with the parameters listed in the table, the following mathematic approach(s) and/or pseudo code is used to illustrate gradual throttling network bandwidth for a particular packet flow. For example, if (U<q*d) (user is not likely to run out of quota in this month)
   Subscriber's transfer speed=S
If (U>q*d) (user is likely to run out of quota before end of this month)
   Subscriber's transfer speed=f(S)

Note that f(S) is a function capable of reducing bandwidth in a linear or nonlinear mathematic function. Alternatively, f(S) can also be a process of obtaining a new bandwidth from a predefined lookup table.

Subscriber's transfer speed f(S) is updated or revised to prevent complete exhaustion of subscribed quota before the end of subscribed period of time. Alternatively, updated or new subscriber's transfer speed f(S) can be obtained from a predefined lookup table, wherein the lookup table contains new transfer speed, such as maximum bandwidth, 90% maximum bandwidth, 75% maximum bandwidth, 50% maximum bandwidth, and so on.

Modifier 188, in one embodiment, can also be configured to adjust the time period for updating bandwidth. For example, a period of time can change from monthly to daily and from daily to hourly because of change in data transfer habits. It should be noted that smaller time interval produces a more accurate average usage of quota in view of network bandwidth.

Flow forwarder 190 routes or forwards the packet flow based on updated bandwidth or transmission speed. In one embodiment, the updated bandwidth is permanent bandwidth for the subscribed period of time until the next update. It should be noted that updated bandwidth or transfer speed can be scaled up or down from the previous bandwidth or transfer speed depending on the available quota and remaining period of time.

TBS 180, in an alternative embodiment, includes flow identifier 184, bandwidth calculator 186, and flow forwarder 190, wherein flow identifier 184 is configured to retrieve a user network subscription upon detecting a user network access. The user network access may be a packet stream requested by the user traveling through the network. Flow detector 182 includes a subscription module and a storage unit wherein the subscription module is able to receive a network service plan from a network client. The storage unit is configured to create a storage location for storing the user network subscription in accordance with the network service plan. Bandwidth calculator 186 is able to calculate available transfer quota in accordance with the user network subscription and transfer quota consumed. Flow forwarder 190 is capable of throttling and/or gradually throttling network bandwidth allocated to the user network access in response to the available transfer quota.

Bandwidth calculator 186, in one embodiment, includes a division element capable of providing an average quota allowed and an average quota consumed. For example, the average daily quota allowed may be computed through dividing the subscribed monthly quota by the number of days in the month, and the average daily quota consumed may be obtained through dividing the amount of quota consumed by the number of days passed in a month. The division element, in one example, is also capable of providing an updated average quota via dividing an amount of quota available by number of days remaining in a month.

An advantage of using TBS 180 is that it controls flow bandwidth or flow speed in view of available subscribed quota for fully utilizing the purchased quota within the subscribed period of time.

Figure 2A:
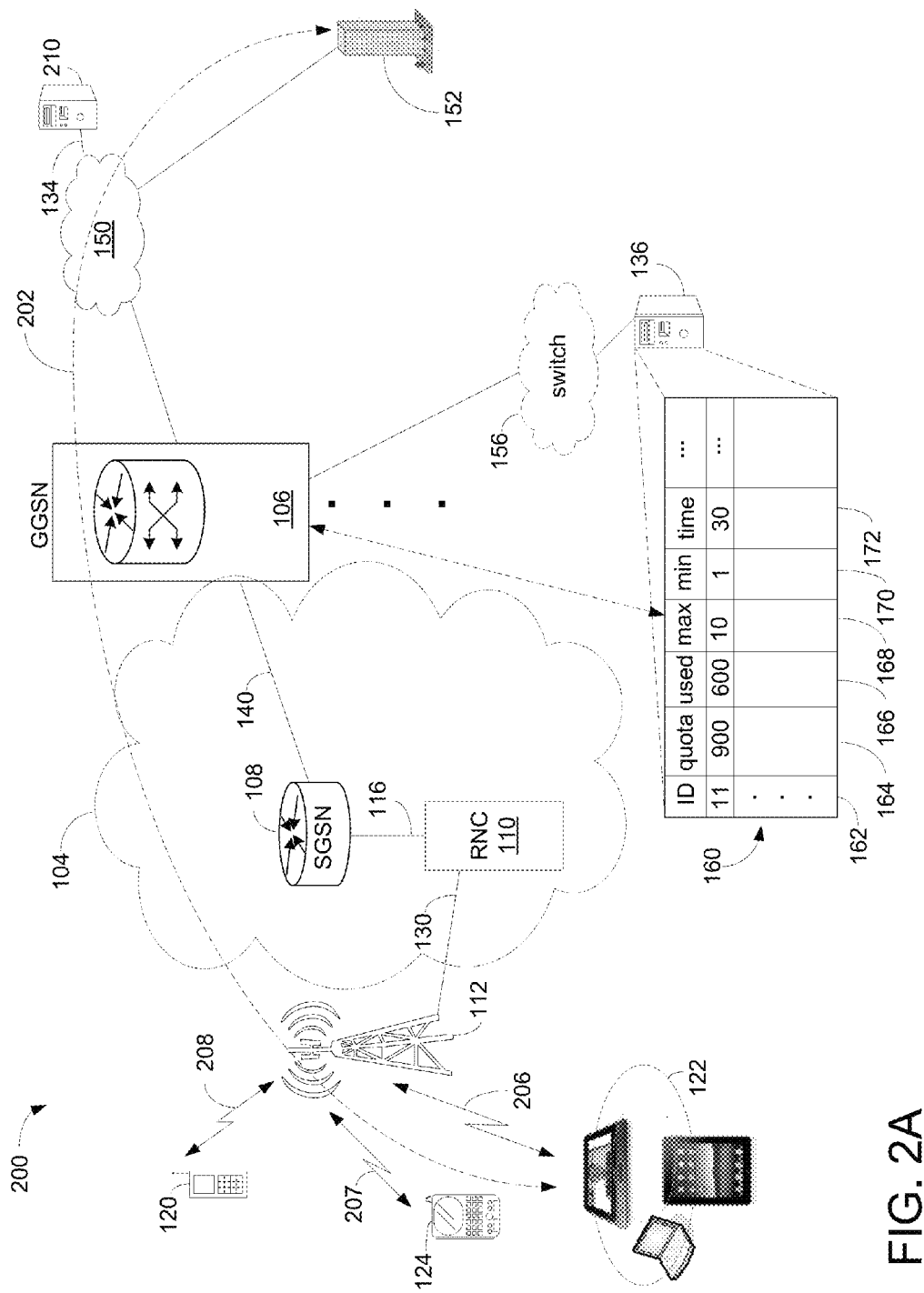
FIGS. 2A-B are block diagrams illustrating simplified networks configured to throttle flow bandwidth based on available transfer quota in accordance with one embodiment of the present invention.
Figure 2B:
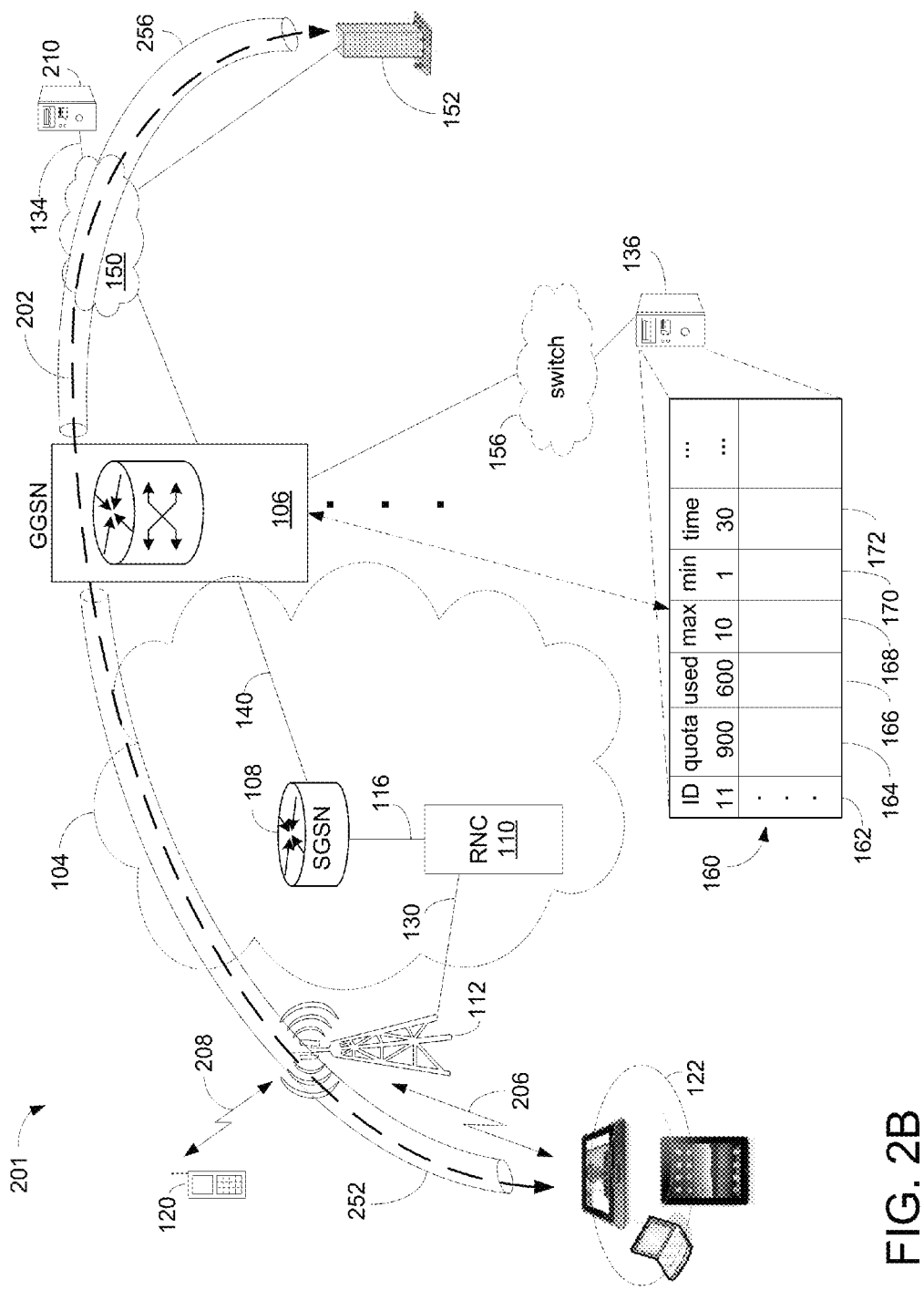

FIGS. 2A-B are block diagrams 200-201 illustrating simplified networks configured to throttle flow bandwidth based on available transfer quota in accordance with one embodiment of the present invention. Diagrams 200 and 201 are simplified versions of diagram 100 as shown in FIG. 1A. Diagram 200 shown in FIG. 2A includes radio tower 112, GGSN 106, SGSN 108, and Internet 150 wherein Internet 150 couples to various network devices such as data server 210 and content provider 152. Radio tower 112 is further coupled to various UEs, such as cellular phone 120, iPad®, and handheld device 124 via wired or wireless communications 206-208. It should be noted that the underlying concept of the exemplary embodiment(s) of the present invention would not change if one or more blocks (or devices) were added to or removed from diagram 200.

To transfer data from content provider 152 to iPad®, GGSN 106, for example, throttles or scales network bandwidth based on the information stored in database 160. When a stream of packets or packet flow travels from content provider 152 to iPad® via a connection or IP session 202, GGSN 106 identifies the flow and obtains subscriptions associated with the flow from database 160. Depending on the available quota and remaining period of time, the bandwidth or transmission speed of the flow can scale up or down.

During an operation, iPad® 122 tries to establish an IP session 202 to access information at content provider 152. Upon detecting the establishment of IP session 202, GGSN 106 provides an updated transfer speed in accordance with available quota relating to IP session 202. The packet flow is subsequently routed through IP session 202 with the updated transfer speed. An updated transfer speed or bandwidth of IP session 252-256 as shown in FIG. 2B is established for rationing or throttling network bandwidth in accordance with the available subscribed quota and remaining period of time. In one embodiment, IP session 202 contains two bandwidths IP session 252-256 wherein bandwidth of IP session 252 has a different transmission speed than bandwidth of IP session 256. The bandwidths of IP sessions 252-256, in one embodiment, are permanent until a tear-down instruction is received. It should be noted that iPad® 122 may have another IP session with different bandwidth in place between iPad® 122 and data server 210.

Figure 3:
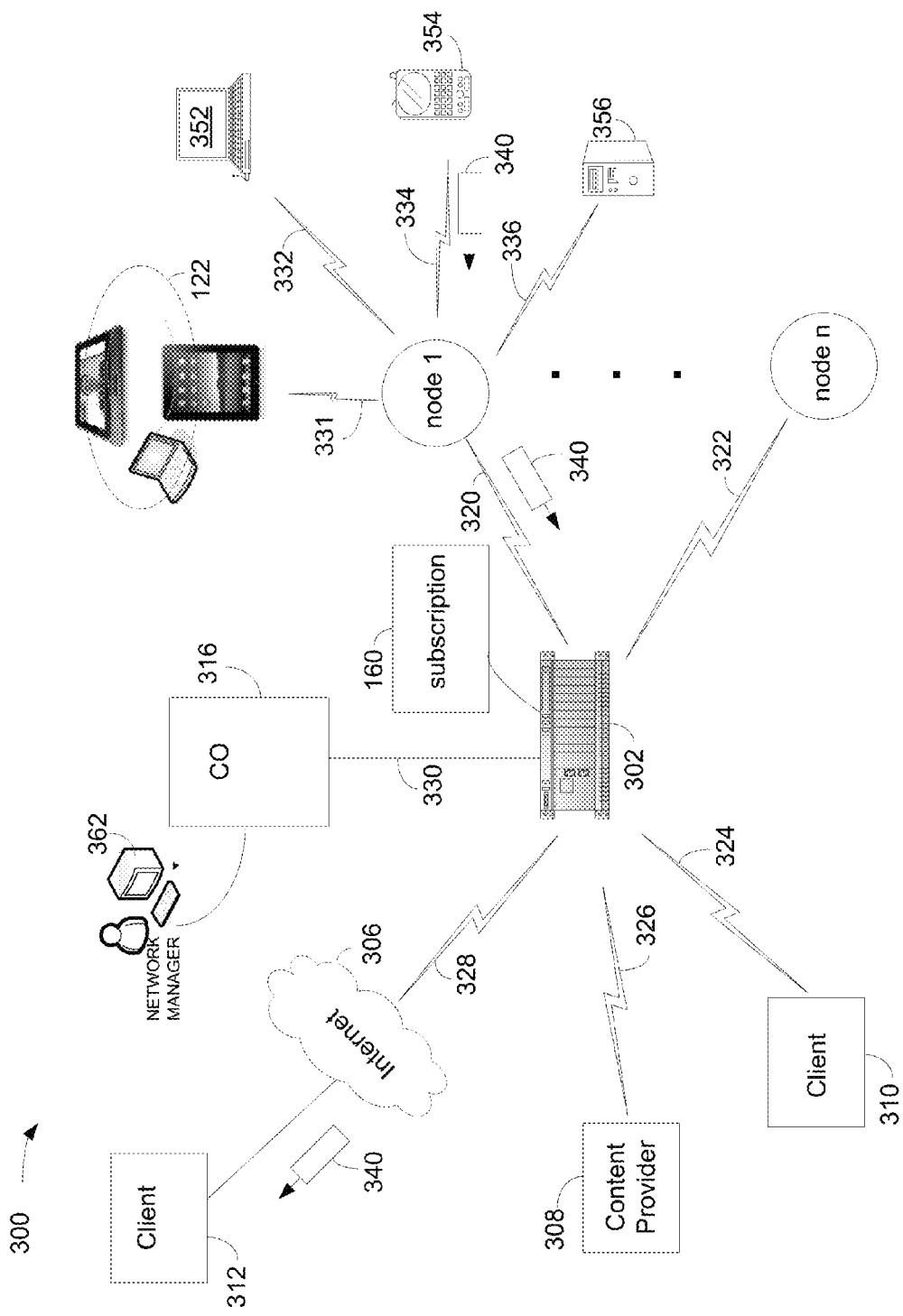
FIG. 3 is a block diagram illustrating an alternative exemplary network system capable of throttling network bandwidth of a packet flow based on available subscribed transfer quota in accordance with one embodiment of the present invention.

FIG. 3 is a block diagram 300 illustrating an alternative exemplary network device capable of throttling network bandwidth of a packet flow based on available transfer quota in accordance with one embodiment of the present invention.

Diagram 300 includes a Policer 302, central office ("CO") 316, content provider 308, clients 310-312, and network nodes (1 to n). Node 1, for example, is a physical network node that can be an NE or a cluster of network devices, such as a router, modem, hub, bridge, switch, handset, computer, server, workstation, et cetera. Node 1, for example, is a network entity capable of coupling to host 352, portable device 354, and server 356 via wireless connections 331-336. It should be noted that the underlying concept of the exemplary embodiment(s) of the present invention would not change if one or more blocks (or devices) were added to or removed from diagram 300.

Policer 302, which can be a router configured to perform functions of GGSN, is able to route network traffic between nodes and/or network clients such as clients 310-312 or devices 352-356. A network manager or administrator 362 is able to communicate with Policer 302 via CO 316. In one embodiment, CO 316 is coupled to Policer 302 via connection 330. Alternatively, CO 316 can be configured to reside within Policer 302. Policer 302 can also be configured to provide routing services to remote clients such as client 312 via Internet 306. Connections 320-328, which can be wired, wireless, or a combination of wired and wireless connections, are employed to couple clients 310-312, content provider 308, and nodes to Policer 302.

Policer 302, in one embodiment, performs a function of a network router capable of routing packet flows between various NEs. At any given time, hundreds or thousands of packets or packet streams may be traveling through a network simultaneously. A function of network router is to monitor, inspect, and route packet streams between clients and nodes in accordance with a set of service parameters, network policy, and rules. For example, a portable handheld device 354 sends a flow 340 to client 312 via node 1. When Policer 302 detects flow 340 at a port connected to connection 320, Policer 302 identifies the destination addresses from the header of flow 340, flow 340 is subsequently routed via a port connected to connection 328. Flow 340 will reach its destination via Internet 306.

To throttle or scale network speed or bandwidth based on available subscribed quota, Policer 302, in one embodiment, reduces and/or gradually reduces the bandwidth (or network speed) of packet flow 340 over a period of time if the amount of subscribed quota is being depleted faster than average depletion rate. Similarly, GGSN 302 may also gradually increase the bandwidth of flow 340 over a period of time if the consumption rate is less than average depletion rate. The average depletion rate, in one example, is Q/M or an average transfer quota per day (total allowed bytes/day) assuming that the time period is a month. GGSN 302 fetches subscription data from database 160 which, for example, may reside in a local memory in Network Manager 362 or Policer 302.

During an operation, Policer 302 is responsible for routing data or packets between connected devices, clients, and/or nodes using a predefined QoS or predefined traffic priorities to ensure smooth routing. During the process of routing, each packet flow traveling through Policer 302 is examined and compared in view of the ID information stored in database 160. The flow bandwidth for flows such as 340 may scale up or down over a period of time based on the available subscribed quota.

Figure 4:
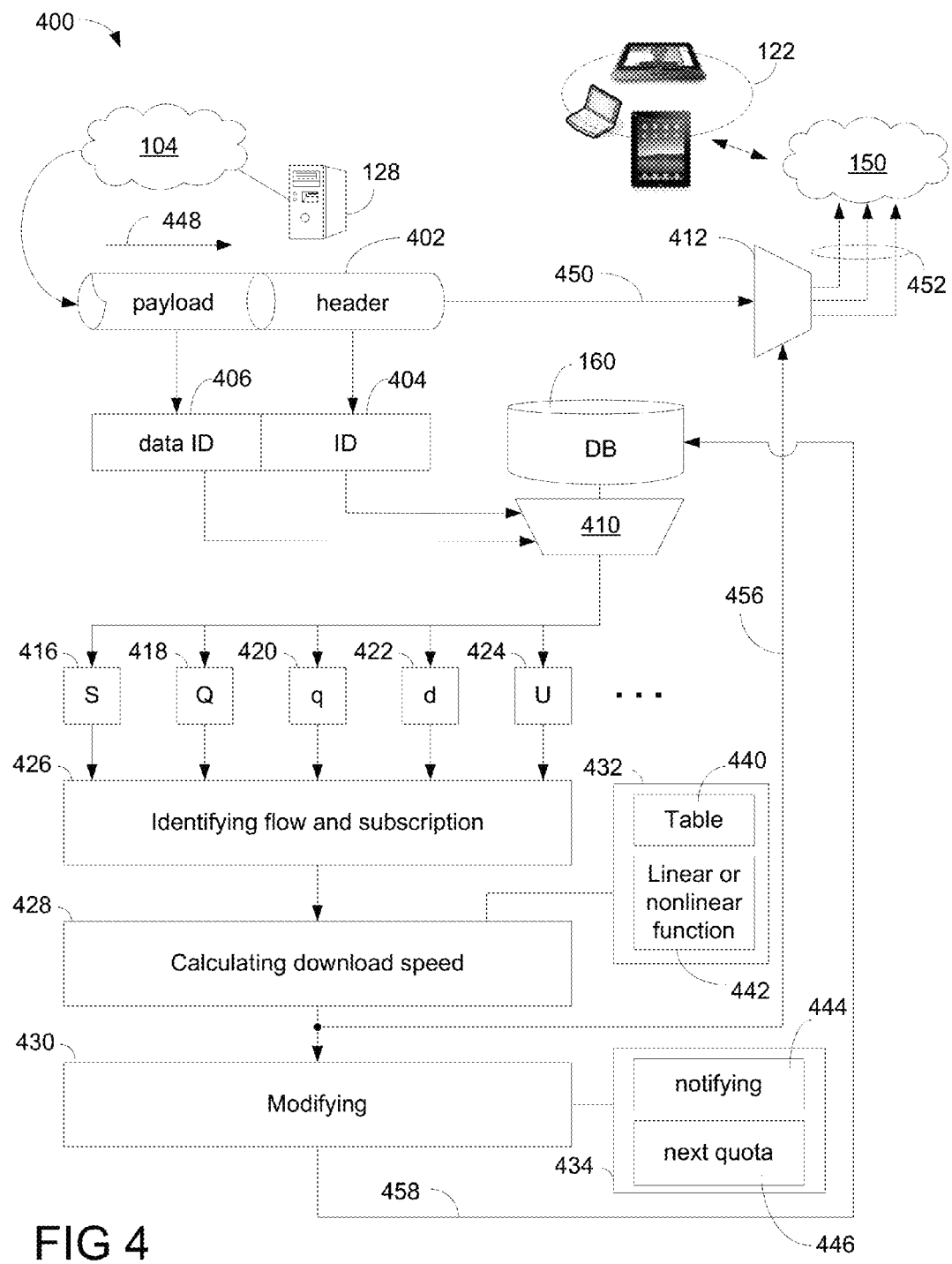
FIG. 4 is a logic flow diagram illustrating a Policer having a TBS capable of throttling flow bandwidth based on available transfer quota in accordance with one embodiment of the present invention.

FIG. 4 is a logic flow diagram 400 illustrating a policer having a TBS capable of throttling flow bandwidth in accordance with available transfer quota in accordance with one embodiment of the present invention. Diagram 400 illustrates an exemplary process of handling a packet 402 traveling in a direction 448 from content server 128 to mobile device 122. TBS, in one embodiment, forwards packet 402 to mobile device 122 with a selected bandwidth via selector 412. The selection of bandwidth, in one embodiment, is based on subscription or data service plan stored in database 160.

Upon detecting packet 402, ID unit 404 extracts header information from the header section of packet 402 while data ID unit 406 extracts payload or at least a portion of payload from the data section of packet 402. ID unit 404 is able to determine flow identity or ID of packet 402 according to the header information, such as, but not limited to, a source address, a destination address, a period of time, and the like. Depending on the applications, a portion of payload is also used together with the header information to identify packet 402. For example, if a user has two data plans wherein one is for email downloading and one is for video streaming, inspecting the payload may identify whether the payload contains video data or email text.

Based on the ID of packet 402, an entry associated with packet 402 is located and fetched from database 160. The entry, in one example, includes subscription information as well as records associated with the flow id, such as maximum transfer quota, amount of quota consumed, maximum speed, minimum speed, and time duration. The information contained in the entry is subsequently distributed to various logic blocks 416-424 for quota evaluation. While S unit 416 is able to determine the maximum transfer speed purchased, Q unit 418 is capable of identifying transfer quota per each period of time such as a month. Also, q unit 420 is employed to calculate the current average transfer quota per time unit, and U unit 424 is configured to determine the amount of transfer (bytes) that has been consumed at the present time.

Block 426 confirms and verifies the flow ID and passes the control to block 428. If the average rate of actual quota consumption is less than the targeted average rate of quota consumption, the bandwidth or network speed for the flow identity remains the same. If, on the other hand, the average rate of actual quota consumption is greater than the targeted average rate of quota consumption, a throttling mechanism is activated. Depending on the applications, bandwidth calculator generates an updated bandwidth for transmitting packet 402 in accordance with a lookup table 440 or a linear or nonlinear function 442. As discussed earlier, a function 442 is a mathematic formula that throttles transfer speed gradually over the remaining portion of time in the current subscription period. A throttling bandwidth signal is generated via connection 456 to drive selector 412.

Block 430 saves the updated network speed at database 160 via connection 458. Note that the updated network speed or bandwidth may be reset at the beginning of the next subscription period. For example, the beginning of each month, the speed or bandwidth resets to the maximum transfer speed according to the subscription. If modification is needed, notifying unit 444 and next quota unit 446 are activated. Depending on the applications or subscriptions, the quota for the next period of time may be kicked in (or added) for the present usage. Alternatively, a notification is sent to the user indicating the depleted transfer quota wherein the user can provide feedback regarding purchasing additional quota or using the quota allocated for the next period of time.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 5:
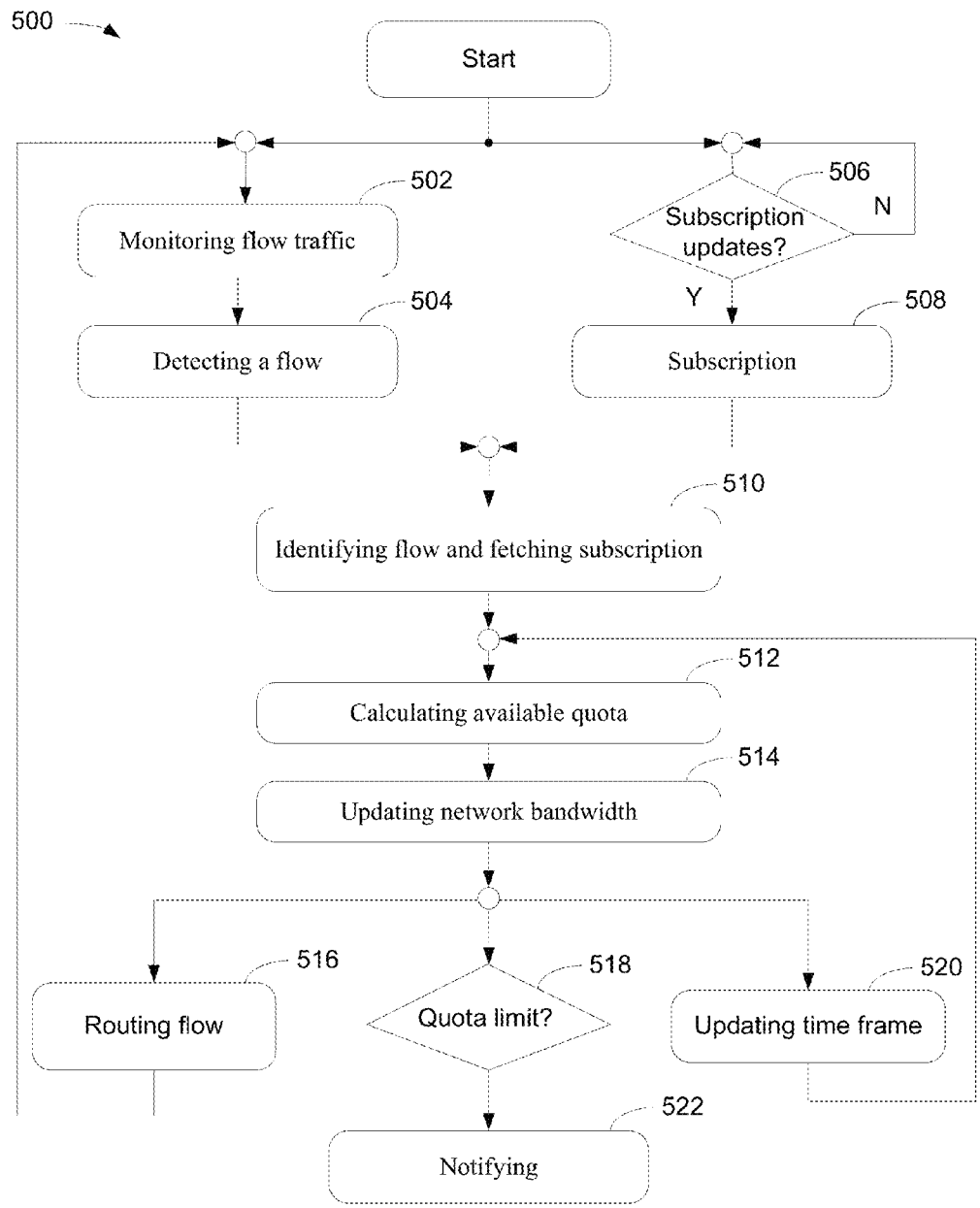
FIG. 5 is a flowchart illustrating a TBS process capable of throttling flow bandwidth based on available transfer quota in accordance with one embodiment of the present invention.

FIG. 5 is a flowchart 500 illustrating a TBS process capable of throttling flow bandwidth based on available transfer quota in accordance with one embodiment of the present invention. At block 502, a TBS process, in one embodiment, monitors and inspects flow traffic traveling through a GGSN, policer, or router. At the same time, the process, at block 506, checks for any new updates relating to existing subscriptions and new subscriptions. If new or updated subscriptions are available, the database storing subscriptions is updated at block 508. For example, upon receiving a new data plan submitted by a new client, a user network subscription in accordance with the data plan is created.

Upon detecting a flow at block 504, the process retrieves a network subscription or data plan from the database at block 510. The available transfer quota and transfer quota consumed are calculated at block 512. For instance, based on user network access record stored in local memory, the process can identify maximum transfer speed and available transfer quota within a predefined time period. Depending on the amount of transfer quota consumed, a new bandwidth or transfer speed is generated at block 514 to gradually throttle network bandwidth allocated to the user network access in response to the available transfer quota.

At block 518, when the depleted quota falls below a predefined minimal level, a notification is broadcasted at block 522 to prevent unintended service interruptions. The process is also capable of determining whether an update of time duration for updating bandwidth is needed at block 520. Based on the nature of data transfer, the process can, for example, switch time duration from daily bandwidth calculation to hourly bandwidth calculation. The new frequency of bandwidth calculation loops to block 512 for the next calculation. At block 516, the process routes the flow based on the updated network bandwidth, and subsequently proceeds to block 502.

Figure 6:
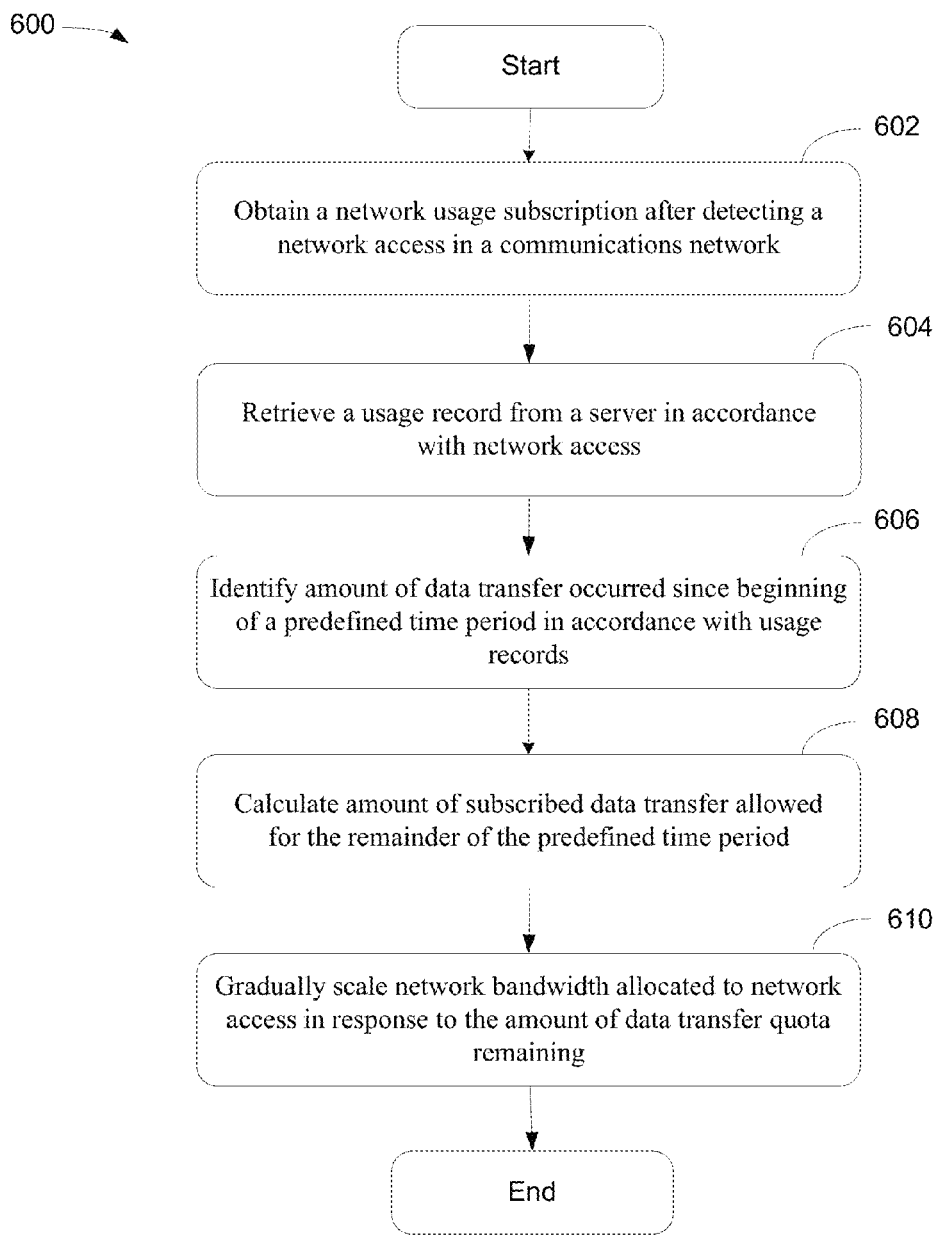
FIG. 6 is a flowchart illustrating a policer configured to throttle network bandwidth based on available transfer quota in accordance with one embodiment of the present invention.

FIG. 6 is a flowchart 600 illustrating a policer configured to throttle network bandwidth gradually based on available transfer quota in accordance with one embodiment of the present invention. At block 602, a process capable of throttling flow bandwidth obtains a first network usage subscription after detecting a first network access in a communications network. The first network access, in one instance, is a packet flow associated with the subscriber. In one embodiment, upon receiving a first subscription purchased or subscribed by a user, a first network usage subscription is created in a database in accordance with the first usage subscription. For example, a range of network bandwidths from maximum to minimum speed is defined in accordance with the first usage subscription. In addition, upon identifying a current network maximum bandwidth, a transfer quota is determined within the first predefined time period. The first predefined time period may be a month.

At block 604, the process is able to retrieve a first usage record from a server in accordance with the first network access. In one example, the statistics related to network usage associated with the first network access is fetched from a local storage in a GGSN.

At block 606, the amount of transfer occurred since the beginning of the first predefined time period is identified in accordance with the first usage records. The process, for instance, is capable of determining the amount of transfer quota consumed since the beginning of the first predefined time period.

At clock 608, the amount of subscribed transfer allowed since the beginning of the first predefined time period is calculated in response to the first network usage subscription. The first predefined time period, for example, can be a month or 30 days. In calculation, an average transfer quota per day allowed is multiplied with days or time passed within the period of time to identify the amount of transfer allowed within the plan.

At block 610, network bandwidth allocated to the first network access is adjusted and/or gradually adjusted in response to the amount of bandwidth consumed. In one embodiment, the process is capable of reducing and/or gradually reducing network speed in response to the amount of transfer occurred and the amount of transfer allowed. In one embodiment, upon obtaining a second network usage subscription after detecting a second network access in the network, a second usage record is retrieved from a storage unit in accordance with the second network access. After identifying the amount of transfer occurred since the beginning of the second predefined time period in accordance with the second usage records, the amount of transfer allowed since the beginning of the second predefined time period is calculated. The process scales and/or gradually scales network bandwidth allocated to the second network access over time in response to the amount of transfer occurred.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for managing network traffic, comprising:
    obtaining a first network usage subscription after detecting a first network access in a communications network;
    retrieving a first usage record from a stored record in accordance with the first network usage subscription;
    identifying amount of data transfer consumed ("DTC") since beginning of a first predefined time period in accordance with the first usage records;
    calculating amount of data transfer allocated ("DTA") since the beginning of the first predefined time period by multiplying average daily transfer quota with time passed since the beginning of the first predefined time period; and
    reducing network bandwidth allocated to the first network access if the amount of DTC is greater than the amount of DTA to prevent exhaustion of data transfer quota before end of the first predefined time period.

2. The method of claim 1, further comprising;
    receiving a first subscription purchased by a user; and
    creating the first network usage subscription in accordance with the first usage subscription.

3. The method of claim 1, wherein obtaining a first network usage subscription includes:
    identifying a current network maximum bandwidth; and
    determining a data transfer quota within the first predefined time period.

4. The method of claim 1, further includes maintaining network bandwidth allocated to the first network access if the amount of DTC is less than the amount of DTA.

5. The method of claim 1, wherein retrieving a first usage record from a storage unit in accordance with the first network access includes fetching network usage statistics associated with the first network access from a local storage in a gateway general packet radio service support node ("GGSN").

6. The method of claim 1, wherein identifying amount of data transfer consumed further includes determining amount of data transfer quota subscribed that is used since the beginning of a first predefined time period.

7. The method of claim 1, further comprising:
obtaining a second network usage subscription after detecting a second network access in the communications network;
retrieving a second usage record from a stored record in accordance with the second network access;
identifying amount of data transfer occurred since beginning of a second predefined time period in accordance with the second usage records;
calculating amount of data transfer allowed since the beginning of the second predefined time period in response to the second network usage subscription; and
scaling network bandwidth allocated to the second network access in response to the amount of data transfer occurred.

8. The method of claim 2, wherein creating the first usage subscription includes defining a range of network bandwidth from maximum to minimum network speed in accordance with the first usage subscription.

9. The method of claim 6, wherein calculating amount of data transfer allocated includes multiplying an average data transfer quota per day allowed with days gone by in a month.

10. The method of claim 9, wherein reducing network bandwidth allocated to the first network access includes reducing network speed in response to amount of data transfer occurred and amount of data transfer allowed.

11. A method for managing traffic bandwidth, comprising:
retrieving a user network subscription in a time period when identifying a user network access;
calculating available data transfer quota in the time period in accordance with the user network subscription and data transfer quota consumed in the time period; and
reducing network bandwidth allocated to the user network access if the data transfer quota consumed is greater than the available data transfer quota to avoid exhaustion of the data transfer quota before end of the time period,
wherein calculating available data transfer quota further includes:
fetching a user network access record from the local memory of a router;
identifying maximum data transfer speed;
determining data transfer quota within a predefined time period; and
identifying amount of data transfer quota consumed.

12. The method of claim 11, wherein retrieving a user network subscription in a time period when identifying a user network access further includes:
receiving a network service plan subscription from a network client; and
creating the user network subscription in accordance with the network service plan subscription.

13. The method of claim 11, wherein identifying maximum data transfer speed includes calculating current data transfer speed in accordance with the available data transfer quota and remaining portion of a predefined time period.

14. The method of claim 13, wherein reducing network bandwidth allocated to the user network access includes reducing network bandwidth for the user network access in response to the current data transfer speed.

15. The method of claim 11, further comprising resetting the network bandwidth for the user network access to maximum data transfer speed when the data transfer quota consumed is less than the available data transfer quota.

16. A throttling bandwidth system comprising:
a flow identifier configured to retrieve a user network subscription upon detecting a user network access;
a bandwidth calculator coupled to the flow identifier and configured to calculate allocated data transfer quota ("DTQ") in a first predefined time period and consumed DTQ in the first defined time period in accordance with the user network subscription, wherein calculating available data transfer quota further includes:
fetching a user network access record from the local memory of a router;
identifying maximum data transfer speed;
determining data transfer quota within a predefined time period; and
identifying amount of data transfer quota consumed; and
a flow forwarder coupled to the bandwidth calculator and able to throttle network bandwidth allocated to the user network access if the consumed DTQ is greater than the allocated DTQ to prevent exhaustion of data transfer quota before end of the first predefined time period.

17. The system of claim 16, further comprising a flow detector coupled to the flow identifier, wherein the flow detector includes:
a subscription module configured to receive a network service plan from a network client; and
a storage unit coupled to the subscription module and configured to create a storage location for storing the user network subscription in accordance with the network service plan.

18. The system of claim 16, wherein the bandwidth calculator further includes a division element capable of providing:
an average data transfer quota allowed via dividing a subscribed data transfer quota by number of days in a subscription period; and
an average data transfer quota consumed via dividing an amount of data transfer quota consumed by number of days passed in a subscription period.

19. The system of claim 18, wherein the division element is capable of providing an updated average data transfer quota via dividing an amount of data transfer quota available by number of days remaining in a subscription period.

* * * * *